United States Patent
Dietrich et al.

(10) Patent No.: US 9,768,595 B2
(45) Date of Patent: Sep. 19, 2017

(54) METHOD FOR PRODUCING SUB-ASSEMBLIES

(71) Applicant: SIEMENS AKTIENGESELLSCHAFT, Munich (DE)

(72) Inventors: Andreas Dietrich, Munich (DE); Chris Hillebrecht, Unterschleissheim (DE); Michael Leisgang, Munich (DE); Thomas Schneider, Schwabenhausen (DE); Erich Schwarz, Gummersbach (DE)

(73) Assignee: SIEMENS AKTIENGESELSCHAFT, Munich (DE)

( * ) Notice: Subject to any disclaimer, the term of this patent is extended or adjusted under 35 U.S.C. 154(b) by 217 days.

(21) Appl. No.: 14/412,745

(22) PCT Filed: Jun. 24, 2013

(86) PCT No.: PCT/EP2013/063132
§ 371 (c)(1),
(2) Date: Jan. 5, 2015

(87) PCT Pub. No.: WO2014/005870
PCT Pub. Date: Jan. 9, 2014

(65) Prior Publication Data
US 2015/0162728 A1 Jun. 11, 2015

(30) Foreign Application Priority Data
Jul. 4, 2012 (DE) .................. 10 2012 211 652

(51) Int. Cl.
*H02G 1/00* (2006.01)

(52) U.S. Cl.
CPC ............... *H02G 1/005* (2013.01); *H02G 1/00* (2013.01); *Y10T 29/49117* (2015.01)

(58) Field of Classification Search
CPC ............ H01B 13/012; H01B 13/01209; H01B 13/01227; H01B 13/01245; H02G 1/00; H02G 1/005; Y10T 29/49117
See application file for complete search history.

(56) References Cited

U.S. PATENT DOCUMENTS

| 2,805,471 A | * | 9/1957 | Lowden | ........... H01B 13/01227 174/72 A |
| 3,377,915 A | * | 4/1968 | Buckett | ............. H05K 13/0053 29/721 |

(Continued)

FOREIGN PATENT DOCUMENTS

| CN | 1285970 A | 2/2001 |
| CN | 101913025 A | 12/2010 |

(Continued)

OTHER PUBLICATIONS

Schuster, Andreas, "Mixed Reality—Augmented Reality", Seminar: Einfuehrung in die Computerbasierten Kuenste SS 2004, Hochschule fuer Gestaltung Karlsruhe, URL: http://www.hfg-karlsruhe.de/~aschuste/ar_referat/referat_final.pdf.

*Primary Examiner* — Carl Arbes
(74) *Attorney, Agent, or Firm* — Laurence Greenberg; Werner Stemer; Ralph Locher

(57) ABSTRACT

A method for producing sub-assemblies such as wiring harnesses/cable ducts includes multiple work steps that are carried out in a common work area. The production process is simplified and sources of error are avoided as far as possible, in that the work steps are displayed optically in the work area.

3 Claims, 1 Drawing Sheet

(56) References Cited

U.S. PATENT DOCUMENTS

| | | | |
|---|---|---|---|
| 3,548,493 A * | 12/1970 | Hubbard | H05K 13/0053 29/407.1 |
| 4,122,357 A * | 10/1978 | Sumida | B60R 16/0207 174/72 A |
| 4,403,155 A * | 9/1983 | Aoki | H02G 3/00 307/10.1 |
| 5,127,062 A | 6/1992 | Cerda | |
| 6,386,512 B1 | 5/2002 | Pecot et al. | |
| 6,946,604 B1 * | 9/2005 | Maris | H01B 13/01227 174/68.1 |
| 7,515,981 B2 | 4/2009 | Ryznar et al. | |
| 2002/0098717 A1 * | 7/2002 | Matsuda | B60R 16/0207 439/34 |
| 2009/0265923 A1 | 10/2009 | MacLean et al. | |

FOREIGN PATENT DOCUMENTS

| | | |
|---|---|---|
| CN | 202110291 U | 1/2012 |
| EP | 417480 B1 * | 1/1995 |
| EP | 1 622 172 A1 * | 2/2006 |
| WO | 03/031094 A1 * | 4/2003 |
| WO | 03031094 A1 | 4/2003 |
| WO | 2007044558 A2 | 4/2007 |
| WO | 2007121729 A2 | 11/2007 |
| WO | 2009120295 A2 | 10/2009 |

\* cited by examiner

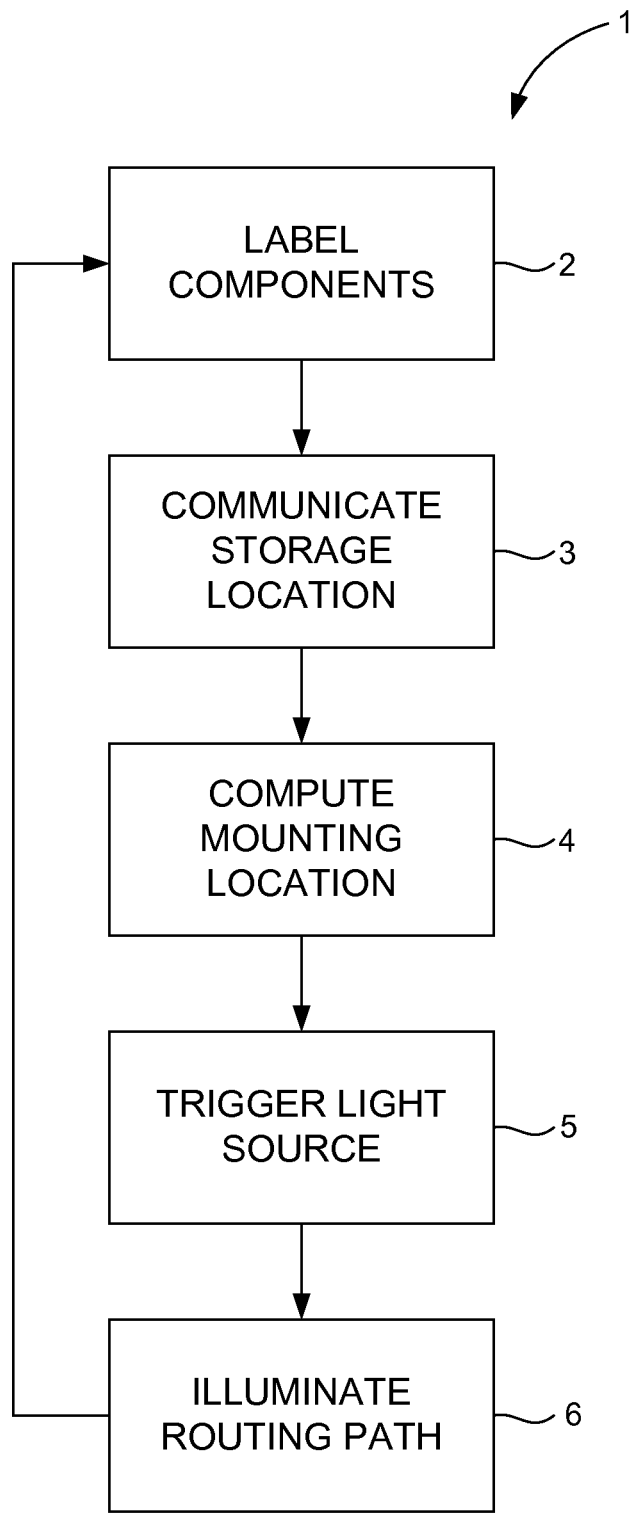

METHOD FOR PRODUCING SUB-ASSEMBLIES

BACKGROUND OF THE INVENTION

Field of the Invention

The invention relates to a method for producing sub-assemblies linked by electrical connections, comprising work steps that are carried out in a common working area.

Sub-assemblies or components are generally installed in their appropriate mounting locations and then connected to other sub-assemblies, such as components, power supply sources or the like, via connections such as cable joints and signal lines. This also involves installing wiring harnesses, e.g. in the floor space of a rail vehicle. To prepare the cables, they are drawn out one-dimensionally and cut to the desired length. In a separate second step, the cables are placed in a two-dimensional arrangement and bound together. This entails many different manual measuring operations. In order to place the cables in the correct arrangement and terminal connection, the routing paths are sketched in paper form or on screens. In each case this representation is spatially separate from the working area in which the components are to be installed. The viewer's eye therefore has to jump back and forth from the information material to the actual mounting location. This is the source of assembly errors.

The object of the invention is therefore to provide a method of the type mentioned in the introduction which facilitates production and prevents sources of error as far as possible.

BRIEF SUMMARY OF THE INVENTION

The invention achieves this object by visually displaying the work steps in the working area.

According to the invention, the next work step, for example, is visually displayed to the installer in the work area. Basically any type of visualization is possible within the scope of the invention. For example, the visualization can consist of illuminating a to-be-accommodated cable of one of the connections, wherein, for example, the cutting length is further indicated adjacent to the cable in the working area. In addition to or instead of visually indicating the cutting length, the cutting point on the cable can be illuminated. Making the work step visible in the working area itself means that the provision of information is no longer spatially separate from the working area. The invention makes it unnecessary for the installer to look back and forth and perform measurements during assembly. The risk of misassembly is therefore reduced. As part of the invention, the working area is made as large as the respective application demands and can be enlarged as required.

For optical visualization of the exact routing path of a cable/wiring harness, it is advantageously illuminated by a light source, the component then being manually installed/routed. The light source used can be e.g. a laser which, for example, revolves around the outlet point via lenses and movable mirrors so rapidly that only a permanent light frame around the outlet is visible to the installer. However, instead of a laser, any other light source such as a white light source or diode can also be used. As well a movable mirrors or other optical components, suitable templates or apertures can also be employed.

The components to be installed in the next or step are advantageously provided with an identifier, wherein visualization can take be place according to the identifier. According to this advantageous further development, a monitoring unit which is equipped with cameras, for example, detects if a work step has been completed. Alternatively, the installer indicates by some form of confirmation that the work step has been completed. If the system detects that the work step is complete, it captures the working area using said cameras, wherein, on the basis of internal logic, the next component to be installed, or the next work step is identified on the basis of its identifier or permanently defined positions. However, cameras are not absolutely necessary as f part of the invention. The entire work progress can also be completely operator-controlled or checked by laser scanners or similar. The next work step is then commenced.

For optical visualization, the routing path or the routing section for a wiring harness of one of the connections advantageously is illuminated using a light source in the working area. According to this advantageous further development, a two-dimensional routing path is visualized by the rapid movement of a light, beam along the routing path. The entire routing path can also be illuminated by means of apertures, masks or templates.

Further expedient embodiments and advantages of the invention. are the subject matter of the following description of examples of the invention which proceeds with reference to the accompanying drawing, wherein the same reference characters denote components that have an identical effect and wherein the

BRIEF DESCRIPTION OF THE DRAWING

FIGURE shows an exemplary embodiment of the method according to the invention.

DESCRIPTION OF THE INVENTION

The FIGURE shows an exemplary embodiment of the method. according to the invention in which the method steps are indicated by boxes. According to the method 1, in the first step 2 the respective identification labeling of the components to be installed is carried out. The storage location is communicated to a central control unit in step 3. In step 4, this central control unit computes the mounting location and triggers, in step 5, an optical unit of a light source to project the light beam produced by the light source into the working area in such a way that the routing path of the cable identified in step 2 is illuminated in step 6, wherein this can also be subdivided into a plurality of sections. If the work step is complete, the method 1 proceeds to the next work step until the component, i.e. the cable duct or wiring harness, is completely installed.

In this system it is immaterial whether individual work steps are machine aided or mechanized. These would be the marking, drawing or inserting of cables. For ergonomic or technically necessary workplace configuration, the working area can likewise be rotated. This is advantageously performed e.g. by a tilt/turn table or similar devices. The position of said table can be both indicated and adjusted directly via a control system.

The invention claimed is:

1. A method for producing rail vehicle sub-assemblies that are linked by electrical connections, the method comprising:
    a plurality of work steps being carried out in a common working area designated for assembling a rail vehicle;
    optically visualizing the work steps in the working area by illuminating a cable, to be taken up, of one electrical connection, and thereby:

visually indicating a cutting length next to the cable in the working area and/or illuminating a cutting point on the cable;

illuminating a routing path for the electrical connections by a light source; and subsequently assembling the electrical connection in the routing path.

2. The method according to claim 1, which comprises performing an assembly at least partly manually.

3. The method according to claim 1, which comprises providing components for assembly with an identifier or fixed storage location, and wherein the visualizing step comprises visualizing according to the identifier or storage location.

* * * * *